United States Patent
Pinger et al.

(10) Patent No.: US 10,538,333 B1
(45) Date of Patent: Jan. 21, 2020

(54) SEAT SYSTEM

(71) Applicant: TIMCO Aviation Services, Inc., Greensboro, NC (US)

(72) Inventors: Chad S. Pinger, Greensboro, NC (US); Richard Rinke, Greensboro, NC (US); Mitchell R. Rife, Greensboro, NC (US); Jose Pevida, Greensboro, NC (US); Jeff Hontz, Greensboro, NC (US)

(73) Assignee: HAECO Americas, Inc., Greensboro, NC (US)

( * ) Notice: Subject to any disclaimer, the term of this patent is extended or adjusted under 35 U.S.C. 154(b) by 343 days.

(21) Appl. No.: 15/587,214

(22) Filed: May 4, 2017

Related U.S. Application Data

(60) Provisional application No. 62/332,206, filed on May 5, 2016.

(51) Int. Cl.
  *B64D 11/00* (2006.01)
  *B64D 11/06* (2006.01)
(52) U.S. Cl.
  CPC .... *B64D 11/00152* (2014.12); *B64D 11/0627* (2014.12); *B64D 11/0638* (2014.12); *B64D 11/0642* (2014.12)
(58) Field of Classification Search
  CPC .......... B64D 11/00152; B64D 11/0627; B64D 11/0638; B64D 11/0642
  USPC ........................................ 297/217.3, 188.07
  See application file for complete search history.

(56) References Cited

U.S. PATENT DOCUMENTS

| | | | |
|---|---|---|---|
| 5,464,083 A | 11/1995 | Arnold et al. | 192/8 |
| 8,210,605 B2 * | 7/2012 | Hough | 297/188.05 |
| 8,667,904 B2 | 3/2014 | Pajic | 108/44 |
| 9,067,682 B2 | 6/2015 | Pajic | 108/44 |
| 9,168,876 B2 | 10/2015 | Pajic | 108/44 |
| 9,403,596 B2 | 8/2016 | Pajic | 297/135 |
| 9,409,647 B2 | 8/2016 | Pajic | 297/135 |
| 9,776,722 B2 * | 10/2017 | Pozzi | |
| 2014/0191005 A1 | 7/2014 | Pajic | 108/44 |
| 2015/0291073 A1 | 10/2015 | Pajic | 108/44 |
| 2016/0023618 A1 | 1/2016 | Pajic | 108/44 |
| 2016/0023766 A1 | 1/2016 | Pajic | 108/44 |
| 2016/0039525 A1 | 2/2016 | Pajic | 108/44 |
| 2016/0114891 A1 | 4/2016 | Pajic | 108/44 |

FOREIGN PATENT DOCUMENTS

| | | | |
|---|---|---|---|
| DE | 102005005654 A1 * | 8/2006 | |
| FR | 3070333 A1 * | 3/2019 | |

\* cited by examiner

*Primary Examiner* — Anthony D Barfield
(74) *Attorney, Agent, or Firm* — MacCord Mason PLLC

(57) ABSTRACT

A seat system for a passenger aircraft. The seat system includes at least one passenger seat and a stowable clamshell holder for a personal electronic device installed into the back of the passenger seat. The personal electronic device (PED) holder includes a door adapted to be movable between an open position and a closed position and a pair of opposed retainers adapted to hold a personal electronic device. The pair of retainers includes a lower back retainer and an upper front retainer whereby the lower back retainer extends above the upper front retainer. The seat system may further include a seat back tray table attached to the back of the passenger seat.

42 Claims, 17 Drawing Sheets

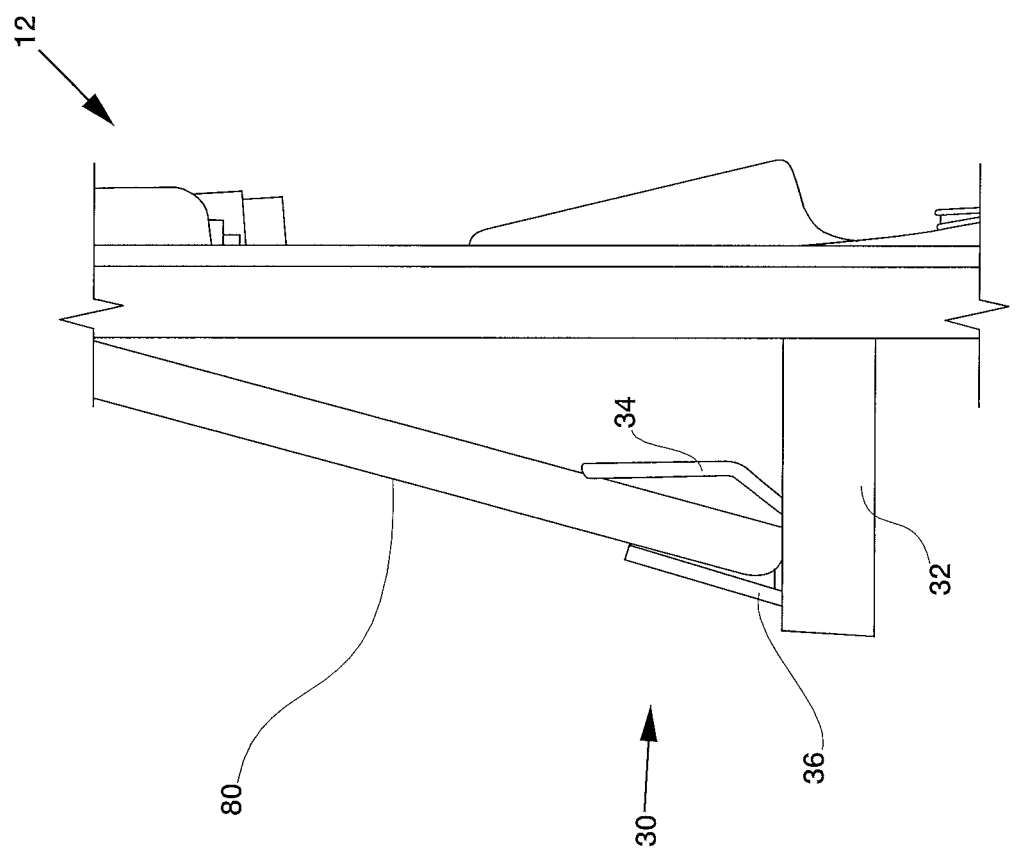

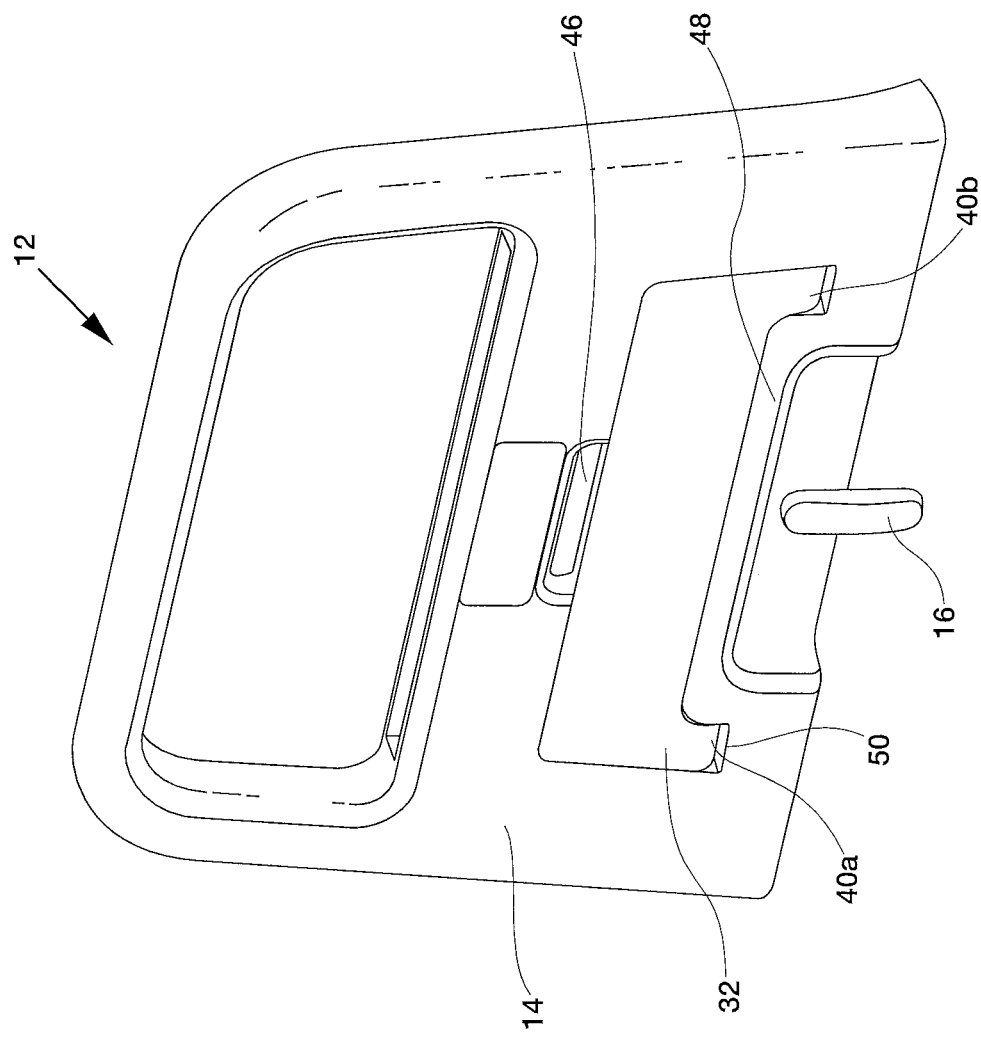

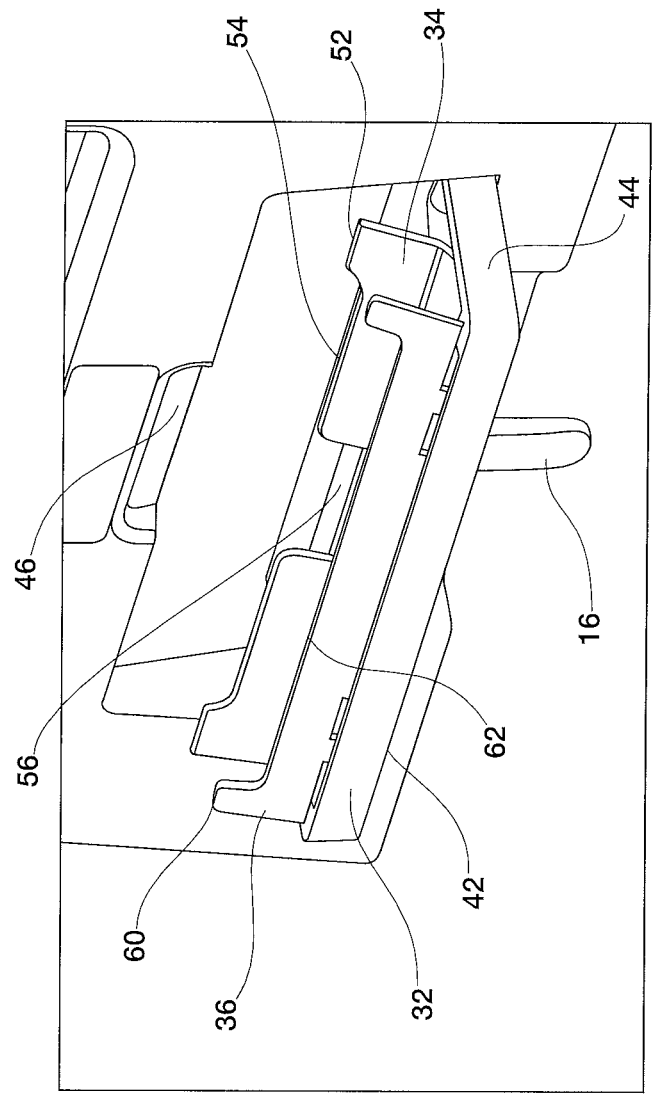

SEAT SYSTEM

CROSS-REFERENCE TO RELATED APPLICATIONS

This application claims the benefit of U.S. Provisional Patent Application No. 62/332,206 filed May 5, 2016, entitled SEAT SYSTEM.

BACKGROUND OF THE INVENTIONS

(1) Field

The present inventions relates generally to seat systems for passenger vehicles and, more particularly, to a seat system for a passenger aircraft.

(2) Related Art

Passenger seats on passenger aircraft, buses, trains and ferries generally are arranged so that each passenger seat, other than the most forward located passenger seats, faces the back of the next forward passenger seat. Many passenger seat backs are utilized to install amenities for the passenger's use during the trip. For example, an upper surface of the seat back may be used to install inflight entertainment, other display devices and/or as an area for additional storage of amenities, such as reading materials or passenger safety cards.

Some passengers prefer to use their own portable electronic devices during air travel; for instance, to view media content stored within the device or to interact with other installed software. Presently, a passenger must either hold the device or place it on a tray table. Holding the device for extended periods of time can lead to muscle fatigue. Placing the device on a tray table could also lead to neck fatigue, particularly if the device is placed at an uncomfortable viewing angle. Moreover, there is a risk of damage to the device or harm to other passengers if the device is not secured to the tray table.

Thus, there remains a need for a new and improved seat system for a passenger aircraft having a holder for a personal electronic device (PED) which is adapted to be installed into the back of the seat system for a passenger aircraft while, at the same time, is stowable within the back of the seat system when not in use to be out of the way of the passenger.

SUMMARY OF THE INVENTIONS

The present inventions are directed to a seat system for a passenger aircraft. The seat system includes at least one passenger seat and a stowable clamshell holder for a personal electronic device installed into the back of the passenger seat. The personal electronic device (PED) holder includes a door adapted to be movable between an open position and a closed position and a pair of opposed retainers adapted to hold a personal electronic device. The pair of retainers includes a lower back retainer and an upper front retainer. In one embodiment, the lower back retainer extends above the upper front retainer. The seat system may further include a seat back tray table attached to the back of the passenger seat.

In one embodiment, the door includes a faceplate and a hinge for opening and closing the door. Also, the PED holder may further including sidewalls along the door, the sidewalls having an interior face and an exterior face.

In one embodiment, the pair of retainers includes a lower back retainer having a hinge positioner mounted to the door and an upper front retainer having a hinge positioner mounted to the lower back retainer whereby the pair of opposed retainers are bi-directionally biased to one another.

In one embodiment, the hinge positioner of the lower back retainer comprises a first hinge positioner and a second hinge positioner located at opposing ends of the lower back retainer, each of the hinge positioners attached to the interior face of the sidewalls enabling a user to position the lower back retainer with respect to a personal electronic device.

The PED holder may further include a gap between the back of the passenger seat and the upper edge of the faceplate, the gap adapted to allow a user to open the door. Also, the PED holder may further include at least one hinge positioner on the hinge adapted to bias the faceplate in the closed position. In one embodiment, the hinge positioner includes at least one torque insert comprising a first cylinder inserted into a cavity of a second cylinder. The hinge positioner may be a pair of torque inserts located at opposing ends of the door, each of the hinge positioners attached to the interior face of the back of the passenger seat.

The PED holder may further include a stop adapted to restrict movement of the faceplate.

In one embodiment, the upper front retainer and the lower back retainer are cantilevered and biased toward each other. The hinge positioner of the upper front retainer may comprise a first hinge positioner and a second hinge positioner spaced apart along the upper front retainer, each of the hinge positioners mounted onto the lower back retainer forming a first hinge and a second hinge, enabling a user to independently position the upper front retainer without needing to adjust the position of the lower back retainer. For example, the first and second hinge positioners for the upper front retainer and the first and second hinge positioners for the lower back retainer may be mounted coaxially. Also, each of the hinge positioners may include at least one torque insert comprising a first cylinder inserted into a cavity of a second cylinder. Also, the first and second hinge positioners are a pair of torque inserts that may be located within the hinge formed by the lower back retainer and the upper front retainer.

In one embodiment, the hinge positioner of the upper front retainer may comprise a first hinge positioner and a second hinge positioner located at opposing ends of the upper front retainer, each of the hinge positioners mounted onto opposing sides of the lower back retainer, whereby a user may independently position the upper front retainer without adjusting the position of the lower back retainer. The first and second hinge positioners for the upper front retainer may be mounted on a first axis and the first and second hinge positioners for the lower back retainer may be mounted on a second axis. Also, the first axis and the second axis may be parallel with respect to each other. Also, the second axis may be positioned below said first axis.

In one embodiment, the torque insert is press fitted.

In one embodiment, the upper edge of the lower back retainer extends past the upper edge of the upper front retainer whereby the lower back retainer is adapted to provide additional support to the back of a PED when in use. Also, the upper edge of the lower back retainer may further include a first portion and a second portion wherein the upper edge of the first portion extends past the upper edge of the second portion, whereby the second portion forms a gap centrally located in the lower back retainer adapted to provide a user gripping area.

The upper edge of the upper front retainer may comprise a first portion and a second portion wherein the upper edge of the first portion extends past the upper edge of the second portion, whereby the second portion is adapted to provide additional support to the front of a PED when in use.

In one embodiment, the PED holder further includes a shroud on the back of the passenger seat. In one embodiment, the PED holder further includes a bezel attached to the back of the passenger seat.

The seat back tray table attached to the back of the passenger seat may be movable between a first storage position and a second deployed position. In one embodiment, a lock mechanism is attached to the back of the passenger seat for retaining the seat back tray table in its secured position.

In one embodiment, the passenger seat further includes a display attached to the back of the passenger seat. The display may also be adjoined by a seat back bezel.

The passenger seat may include a base frame, a seat component attached to the base frame and a backrest attached to the base frame adjoining the seat component. Also, the backrest may further include a headrest. In one embodiment, the headrest is adjustable to accommodate for the height of the passenger.

The passenger seat may further include an upholstery package. In addition, the passenger seat may further include a trim package.

Accordingly, one aspect of the present inventions is to provide a seat system for a passenger aircraft, the seat system including (a) at least one passenger seat; and (b) a stowable clamshell holder for a personal electronic device (PED) installed into the back of the passenger seat.

Another aspect of the present inventions is to provide in a seat system for a passenger aircraft wherein the seat system includes at least one passenger seat having a backrest, the improvement comprising a stowable clamshell holder for a personal electronic device (PED) adapted to be installed into the back of a seat system for a passenger aircraft wherein the seat system includes at least one passenger seat, the PED holder including (a) a door adapted to be movable between an open position and a closed position; and (b) a pair of opposed retainers adapted to hold a personal electronic device, the pair of retainers including a lower back retainer having a first height and an upper front retainer having a second height wherein the first height of the lower back retainer extends above the second height of the upper front retainer.

Still another aspect of the present inventions is to provide a seat system, the seat system including (a) at least one passenger seat; (b) a stowable clamshell holder for a personal electronic device (PED) installed into the back of the passenger seat, the PED holder including (i) a door adapted to be movable between an open position and a closed position and (ii) a pair of opposed retainers adapted to hold a personal electronic device, the pair of retainers including a lower back retainer having a first height and an upper front retainer having a second height wherein the first height of the lower back retainer extends above the second height of the upper front retainer; and (c) a seat back tray table attached to the back of the passenger seat.

These and other aspects of the present inventions will become apparent to those skilled in the art after a reading of the following description of embodiments when considered with the drawings.

BRIEF DESCRIPTION OF THE DRAWINGS

FIG. 5 is an enlarged side elevational view of the PED holder in FIG. 4;

FIG. 6 is an enlarged rear perspective view of the PED holder in a closed configuration;

FIG. 7B is an enlarged rear perspective view of the PED holder in a fully open configuration;

DESCRIPTION OF THE EMBODIMENTS

Figure 1:
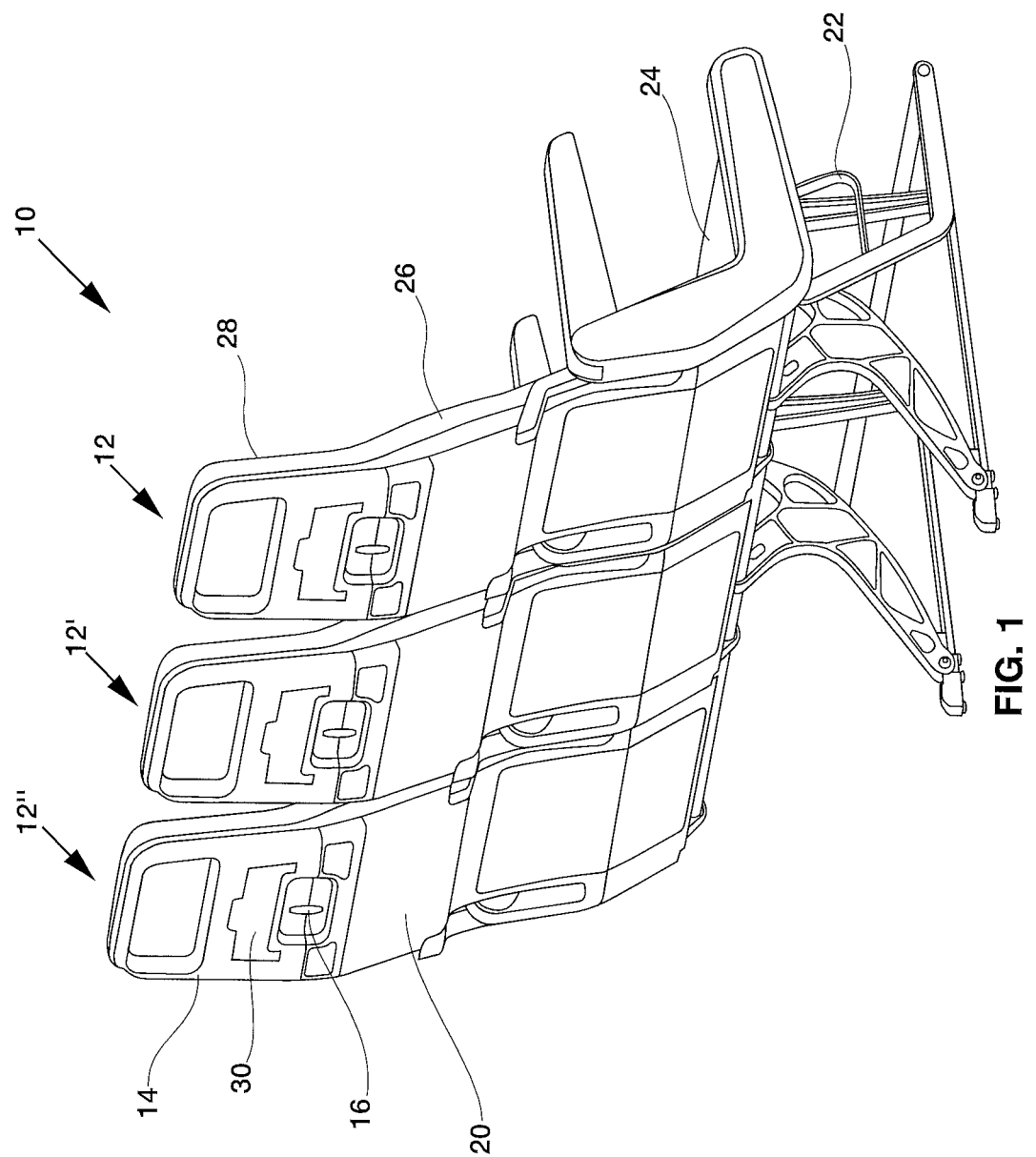
FIG. 1 is a rear perspective view of one embodiment of a seat system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

As best seen in FIG. 1, a seat system, generally designated 10, is shown constructed according to the present inventions. The seat system 10 includes at least one passenger seat 12.

Each of the passenger seats 12 may include a base frame 22, a seat component 24 attached to a base frame and a backrest 26 attached to the base frame 22 adjoining the seat component 24. The backrest 26 may further include a headrest 28. In one embodiment, headrest 28 is adjustable to accommodate the height of a passenger.

A seat back bezel 14 is attached to the back of the passenger seat 12. The seat back bezel 14 may adjoin a seat back tray table 20 attached to the back of passenger seat 12. The seat back tray table 20 attached to the back of the passenger seat 12 is movable between its first storage position and a second deployed position. A lock mechanism 16 attached to the back of the seat back bezel 14 is adapted to retain the seat back tray table 20 in its secured position. The passenger seat 12 may further include an upholstery package and may include a trim package. The passenger seat 12 may further include a shroud or bezel mounted onto its back. A stowable clamshell holder 30 adapted to hold a personal electronic device ("PED holder") is installed into seat back bezel 14.

Figure 2:
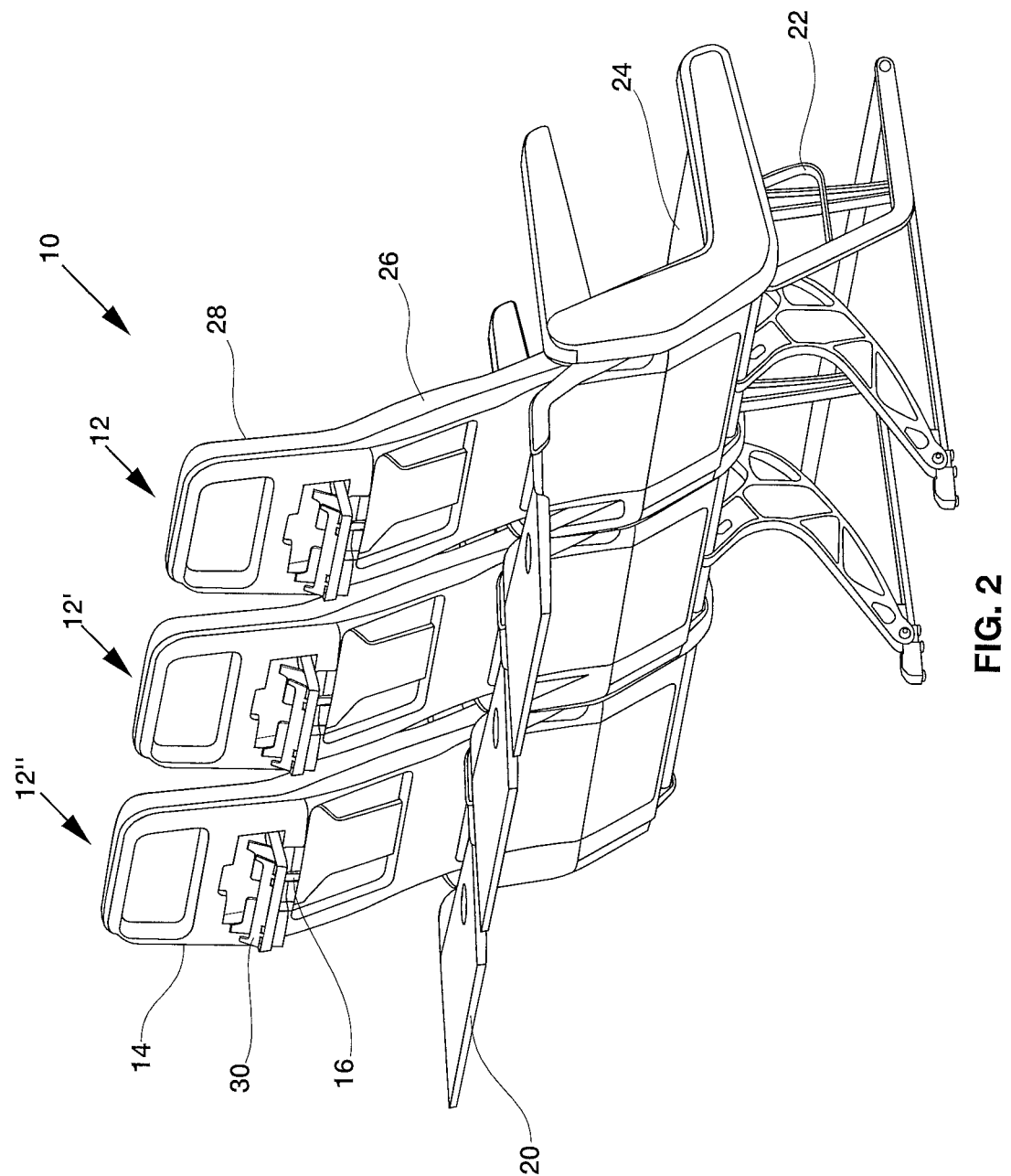
FIG. 2 is a rear perspective view of the embodiment in FIG. 1 with the tray table and stowable clamshell holder for a personal electronic device (PED) in open configurations.
Figure 3:
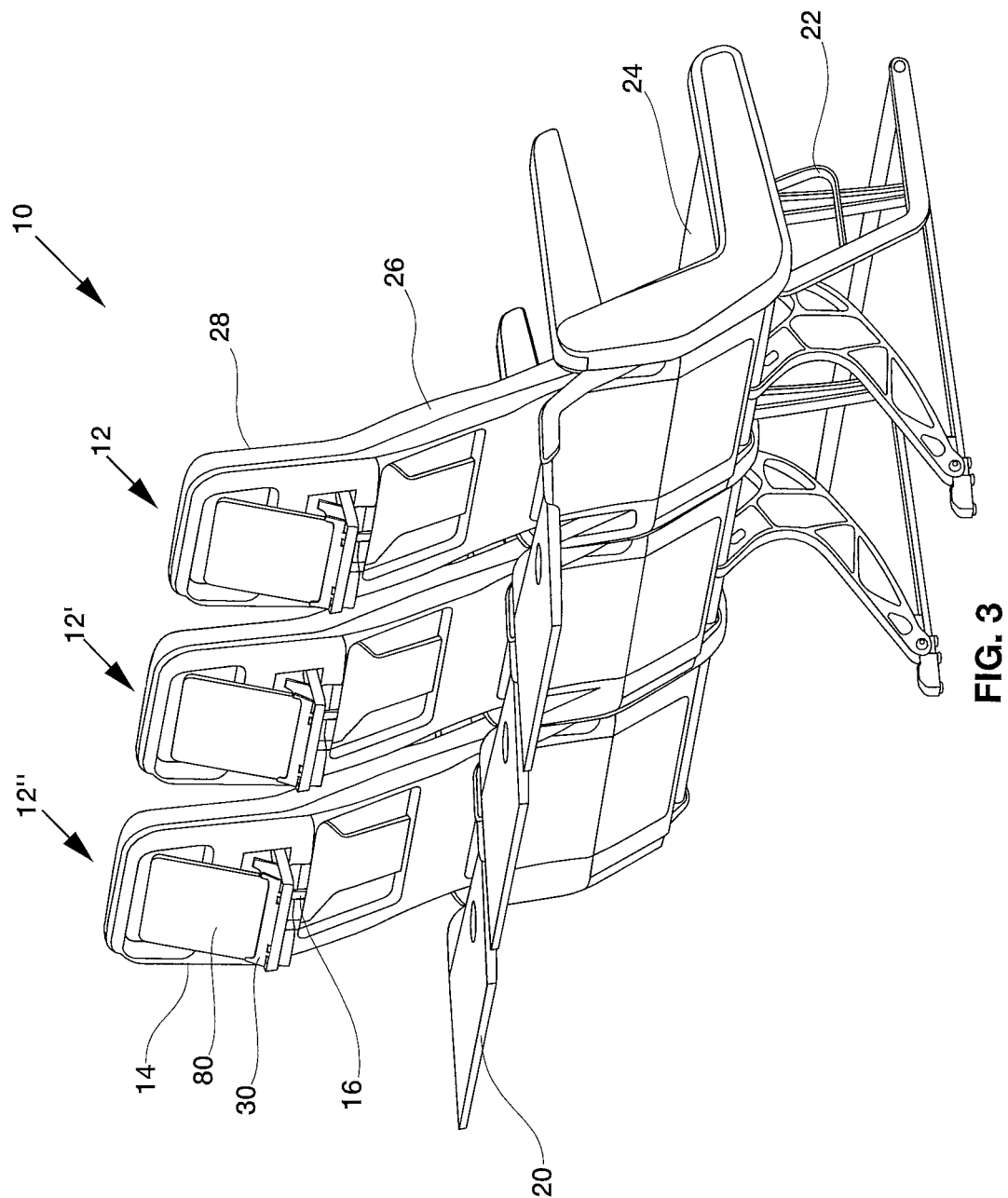
FIG. 3 is a rear perspective view of the embodiment in FIG. 2 with a personal electronic device mounted in the PED holder.

FIG. 2 shows both the PED holder 30 and tray table 20 in open configurations. As best seen in FIG. 3, a personal electronic device 80 may be mounted onto PED holder 30. Personal electronic device 80 may be a touchscreen device such as a phone or tablet.

Figure 4:
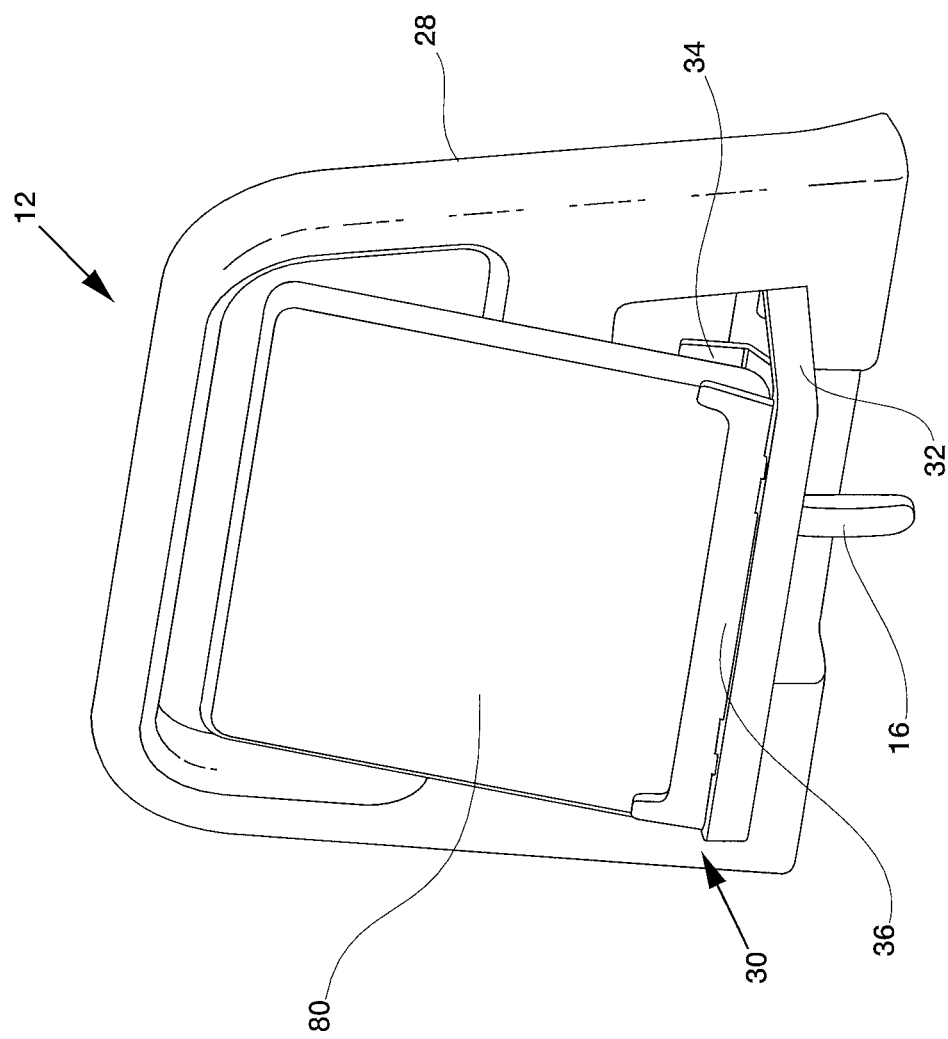
FIG. 4 is an enlarged rear perspective view of the PED holder with a personal electronic device.

One embodiment of a PED holder 30 having a personal electronic device 80 mounted is shown in FIG. 4. In the embodiment shown, personal electronic device 80 is inserted between a pair of opposed retainers installed onto a door 32. As seen in FIG. 4, the pair of retainers comprises a lower back retainer 34 and an upper front retainer 36. The pair of opposed retainers may be biased toward one another to secure personal electronic device 80 in place. FIG. 5 illustrates the lower back retainer 34 and upper front retainer 36 with personal electronic device 80 positioned at a viewing angle. The pair of retainers 34,36 may be positioned to adjust the viewing angle accordingly. Moreover, each retainer may be independently positionable to accommodate various thicknesses for personal electronic devices. In some examples, personal electronic device 80 may be mounted with a cover, protective case, or the like installed.

Turning now to FIG. 6, door 32 is shown in a closed configuration. In the embodiment shown, door 32 is installed onto the back of passenger seat 12 via a pair of hinges 40a,40b. A gap 46 may be included to facilitate opening door 32. Door 32 may be opened by pulling it away from the back of passenger seat 12. As shown in FIG. 6, gap 46 is positioned between the back of the passenger seat and the upper edge of door 32. In other embodiments, gap 46 may be positioned along a side edge of door 32. Yet in other embodiments, door 32 may be opened by pressing door 32 toward the back of the passenger seat. Hinges 40a, 40b may further include a hinge positioner to bias door 32 in the closed position depicted in FIG. 6. For example, the hinge positioner may be a friction hinge, such as a torque insert. The torque insert may comprise a first cylinder inserted into the cavity of a second cylinder. One example of a suitable torque insert is stock number TI-120-0.25-01 available from Reell Precision Manufacturing, Inc. in St. Paul, Minn. In other examples, the hinge positioner may comprise a spring-biased hinge. For instance, the hinge positioner may comprise a gas spring. Use of a hinge positioner eliminates the need for including a locking assembly to hold door 32 in a closed configuration. Nevertheless, a locking assembly may be used in alternative embodiments.

Figure 7A:
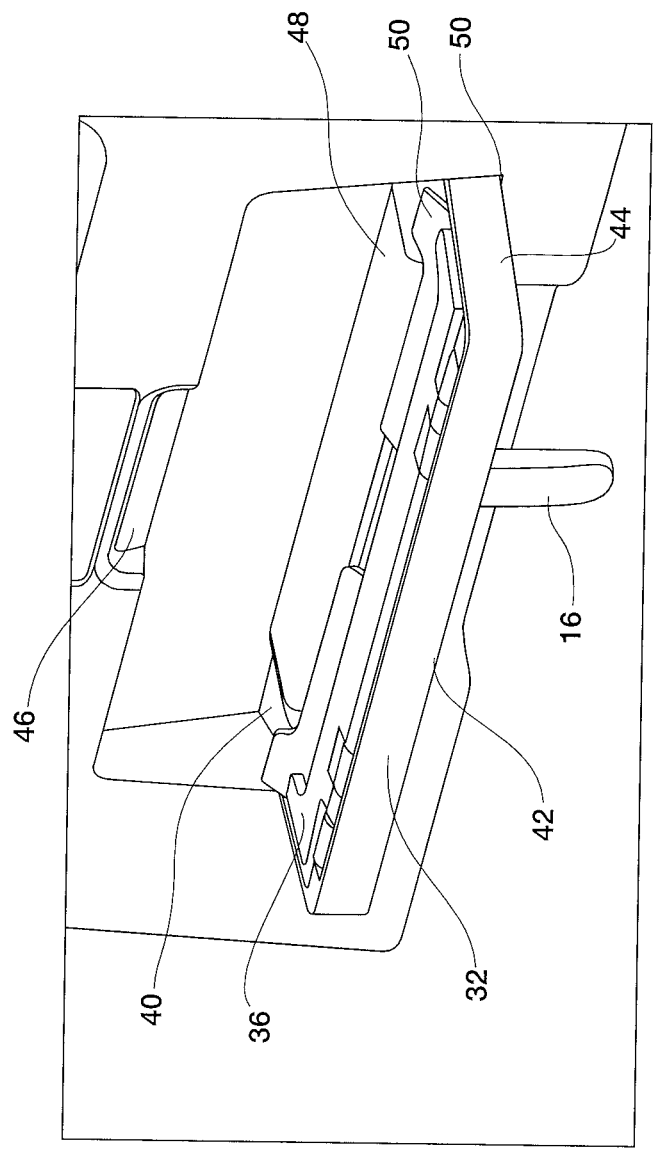
FIG. 7A is an enlarged rear perspective view of the PED holder in a partially open configuration.
Figure 8:
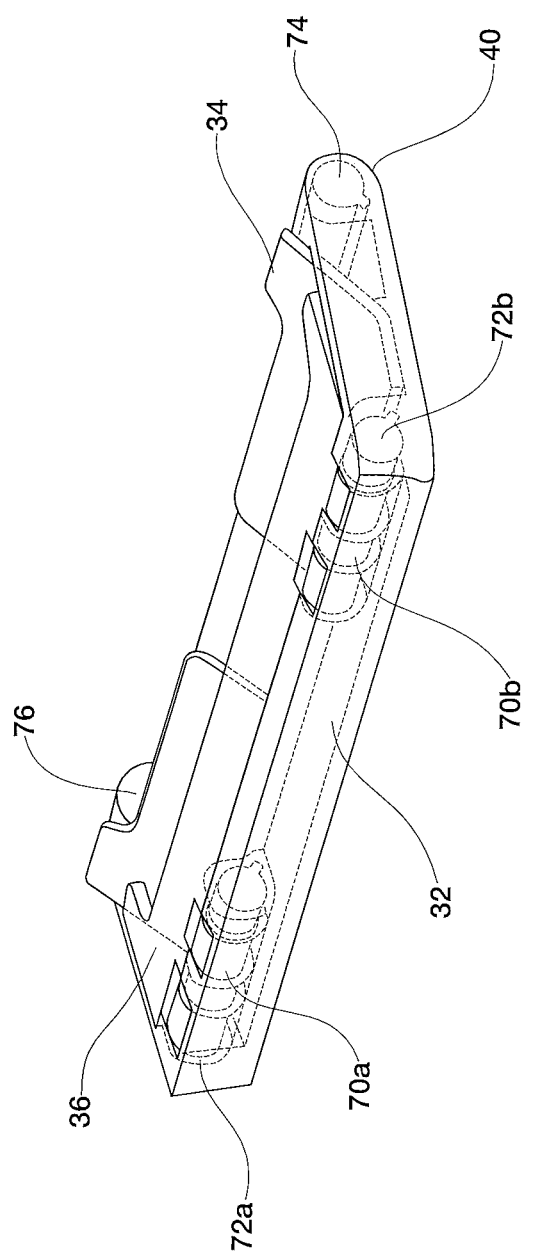
FIG. 8 is a partially transparent perspective view of the PED holder in a partially open configuration.

FIG. 7A shows door 32 in an open configuration. As shown, hinges 40 are connected to the interior face of the back of the passenger seat. In one embodiment, the outer ends 74 of hinges 40 are connected to the seat back and the inner ends 76 of hinges 40 are connected to door 32. FIG. 8 provides a view of the inner and outer ends of hinges 40. In the embodiment shown in FIG. 7A, the inner ends 76 of hinges 40 are connected to a raised surface 48 formed from the back of the passenger seat. Raised surface 48 forms a stop 50 to restrict movement of door 32 beyond a certain threshold. Stop 50 enables door 32 to remain level and helps prevent door 32 from rotating to an undesirable angle.

As seen in the embodiment of FIG. 7A, door 32 comprises a faceplate 42 and further includes sidewalls 44. Each sidewall 44 includes an interior face and an exterior face, wherein the exterior faces of each sidewall 44 are facing away from one another. In the configuration shown in FIG. 7A, lower back retainer 34 and upper front retainer 36 are in a lowered stowed position. In the stowed position shown, the upper front retainer 36 partially overlaps the lower back retainer 34. The stowed position is useful for closing door 32 and thereby stowing away PED holder 30 into the back of the passenger seat.

Turning to FIG. 7B, door 32 is in an open configuration with the lower back retainer 34 and the upper front retainer 36 in a mountable position for receiving a personal electronic device 80. In the embodiment shown, the upper edge of lower back retainer 34 includes a first portion 52 and a second portion 54. First portion 52 extends past second portion 54. The second portion 54 of the upper edge includes a gap 56 that is adapted to provide a user gripping area. The user gripping area may facilitate positioning of lower back retainer 34 from a stowed position to a mountable position, or may be used to refine the positioning of lower back retainer 34. Gap 56 may also be useful for positioning accessory ports to be accessible. Accessory ports may include headphone jacks, USB ports, or a power cord input. In some embodiments, gap 56 is sized such that a phone may be mounted onto PED holder 30. As depicted in FIG. 7B, gap 56 is centrally located on the second portion 54 of lower back retainer 34. Yet in other embodiments, gap 56 may be off-centered. In alternative embodiments, lower back retainer 34 may have more than one gap or no gap at all. Further embodiments may include a lower back retainer 34 having a single-portioned upper edge.

Lower back retainer 34 may also be angled, as best seen in FIGS. 5 and 7B. Incorporating an angle into lower back retainer 34 may be useful for optimizing the viewing angle of personal electronic device 80 as well as accommodate variations in thicknesses due to the device itself or the installation of other accessories. The upper edge of lower back retainer 34 may extend past the upper edge of upper front retainer 36, so that lower back retainer 34 provides additional support to the back of personal electronic device 80 when in use.

The upper front retainer 36 is positioned in front of lower back retainer 34 and may be adapted to support a portion of the front face of personal electronic device 80. In one embodiment, the upper front retainer 36 may have a single-portioned upper edge. For example, the upper edge may be flat or curved. In the embodiment shown in FIG. 7B, the upper edge of upper front retainer 36 includes a first portion 60 and a second portion 62, with the upper edge of first portion 60 extending past the upper edge of second portion 62. First portion 60 may be useful for providing additional support to personal electronic device 80, while at the same time, not obstructing the view of personal electronic device 80. When a personal electronic device 80 is mounted, first portion 60 may be positioned along the bezel of personal electronic device 80. A lowered second portion 62 can provide additional support to the device, while at a lowered height that minimizes view obstruction. Having a lowered height for second portion 62 may also enable accessibility of physical buttons located on the face of personal electronic device 80.

In yet other embodiments, the upper edge of second portion 62 may extend past the upper edge of first portion 60. For example, second portion 62 may provide a central support for personal electronic device 80 and first portion 60 may provide support along the lower bezel of personal electronic device 80.

The pair of opposed retainers may be installed in various configurations. For example, the pair of retainers may be cantilevered and biased toward each other. In an embodiment, lower back retainer 34 includes a hinge positioner mounted to door 32 and upper front retainer 36 includes a hinge positioner mounted to the lower back retainer 34. FIG.

8 depicts a configuration in accordance with one embodiment, wherein the hinge positioners for lower back retainer 34 and upper front retainer 36 are coaxially mounted. A first hinge positioner 70a and a second hinge positioner 70b are installed on opposing sides of lower back retainer 34. Opposing ends 72a and 72b of hinge positioners 70a and 70b are inserted into a recess within the interior faces of their respective sidewalls.

Figure 9:
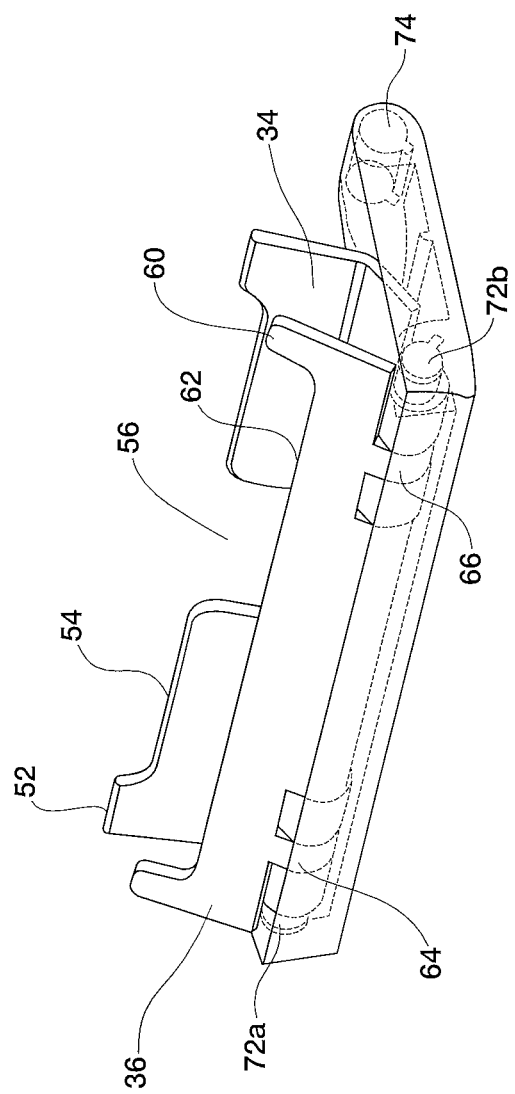
FIG. 9 is a partially transparent perspective view of the PED holder in a fully open configuration.

In the embodiment shown in FIG. 9, upper front retainer 36 is mounted onto lower back retainer using hinges 64 and 66. Hinges 64 and 66 are centrally attached to and pivot along hinge positioners 70a and 70b. The viewing angle of personal electronic device 80 may be quickly adjusted without necessarily having to individually adjust the lower back retainer 34 and upper front retainer 36, when the pair of retainers share a hinge positioner. Upper front retainer 36 may also be adjusted independently without having to readjust lower back retainer 34. In alternate embodiments, the hinge positioner may be installed onto sidewalls 44 or faceplate 42 of door 32 in other embodiments.

In other embodiments, both lower back retainer 34 and upper front retainer 36 may have independent hinge positioners. For example, hinge positioner 70 for upper front retainer 36 may be mounted on a first axis and hinge positioner 72 for lower back retainer 34 may be mounted on a second axis. In one embodiment, the first and second axes that the upper front and lower back retainers rotate along are parallel with respect to each other. An advantage of these embodiments is that a user can independently position either the upper front retainer or the lower back retainer without needing to adjust the position of the other.

Figure 10:
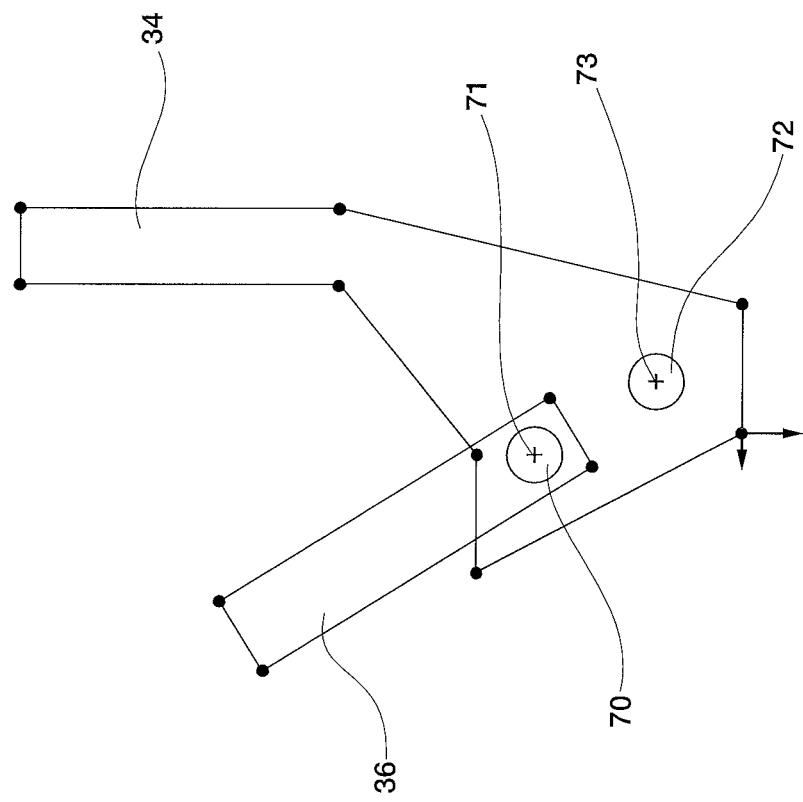
FIG. 10 is an enlarged side elevational view of another embodiment of a PED holder constructed according to the present inventions.

One example of such an embodiment is shown in FIG. 10, wherein PED holder 30 forms a claw-shaped design having a lower back retainer as the hand and the upper front retainer as the opposable thumb. In this particular configuration, lower back retainer 34 includes a cavity for the lower end of upper front retainer 36 to be inserted. The hinge positioners 70 of upper front retainer 36 comprises a first hinge positioner and a second hinge positioner located at opposing ends of upper front retainer 36 that are inserted into recesses located on opposing sidewalls within the cavity of lower back retainer 34. The hinge positioners 72 of lower back retainer 34 are located at opposing ends of lower back retainer 34 that are inserted into a recess within the interior faces of their respective sidewalls. Hinge positioners 70 are mounted along a first axis 71, and hinge positioners 72 are mounted along a second axis 73. As configured in FIG. 10, second axis 73 is positioned lower than first axis 71. In other embodiments, second axis 73 may be positioned across or higher than first axis 71.

Hinge positioners 70a and 70b may be a friction hinge, such as a torque insert. The torque insert may comprise a first cylinder inserted into the cavity of a second cylinder. One example of a suitable torque insert is stock number TI-120-0.25-01 available from Reell Precision Manufacturing, Inc. in St. Paul, Minn. In other examples, the hinge positioner may comprise a spring-biased hinge. For instance, the hinge positioner may comprise a gas spring. In some embodiments, hinge positioners for lower back retainer 34 and upper front retainer 36 are identical in type. In other embodiments, lower back retainer 34 and upper front retainer 36 differ in the type of hinge positioners employed. Moreover, the hinge positioners of door 32 may differ from those used with the pair of opposing retainers.

Figure 11:
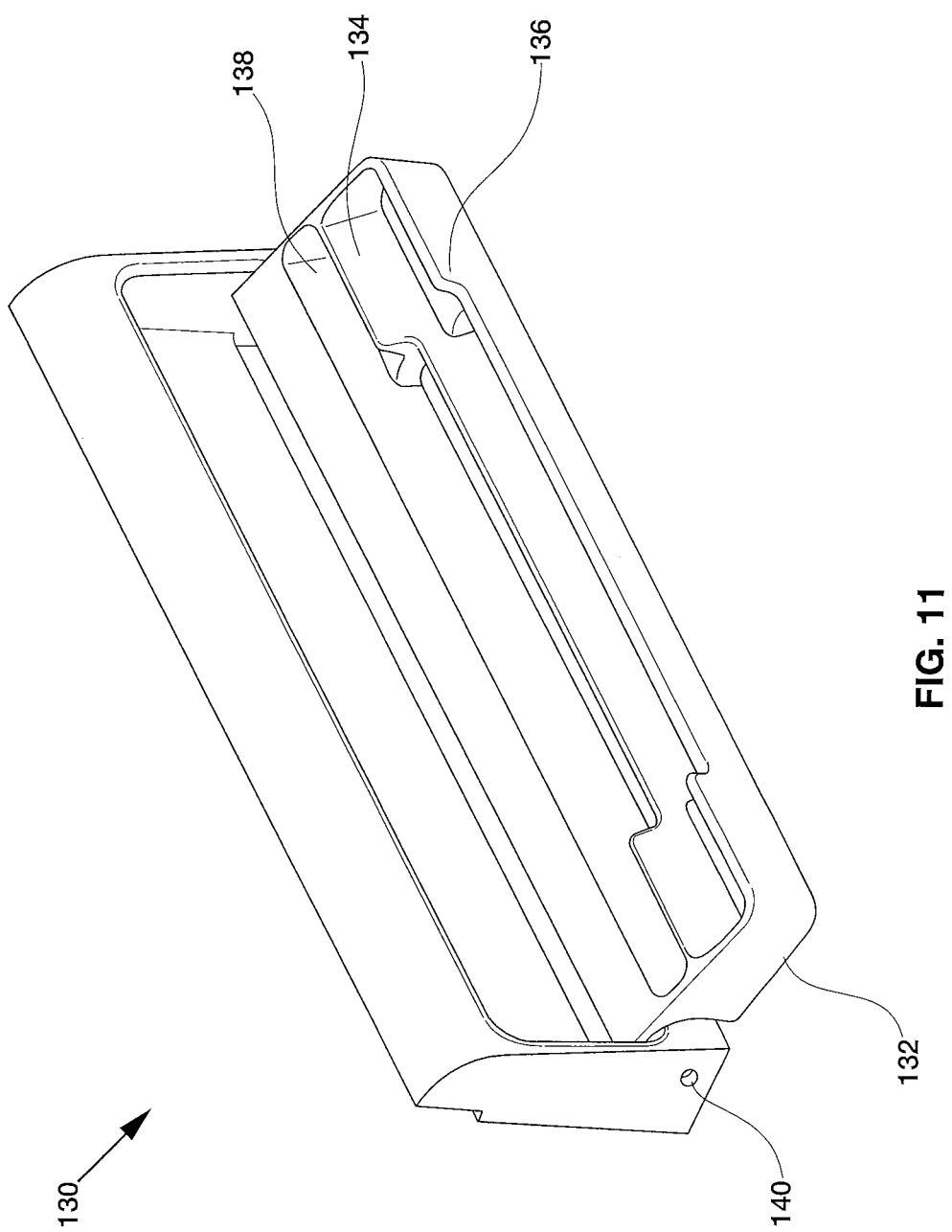
FIG. 11 is a top perspective view of another embodiment of a PED holder constructed according to the present inventions.
Figure 12:
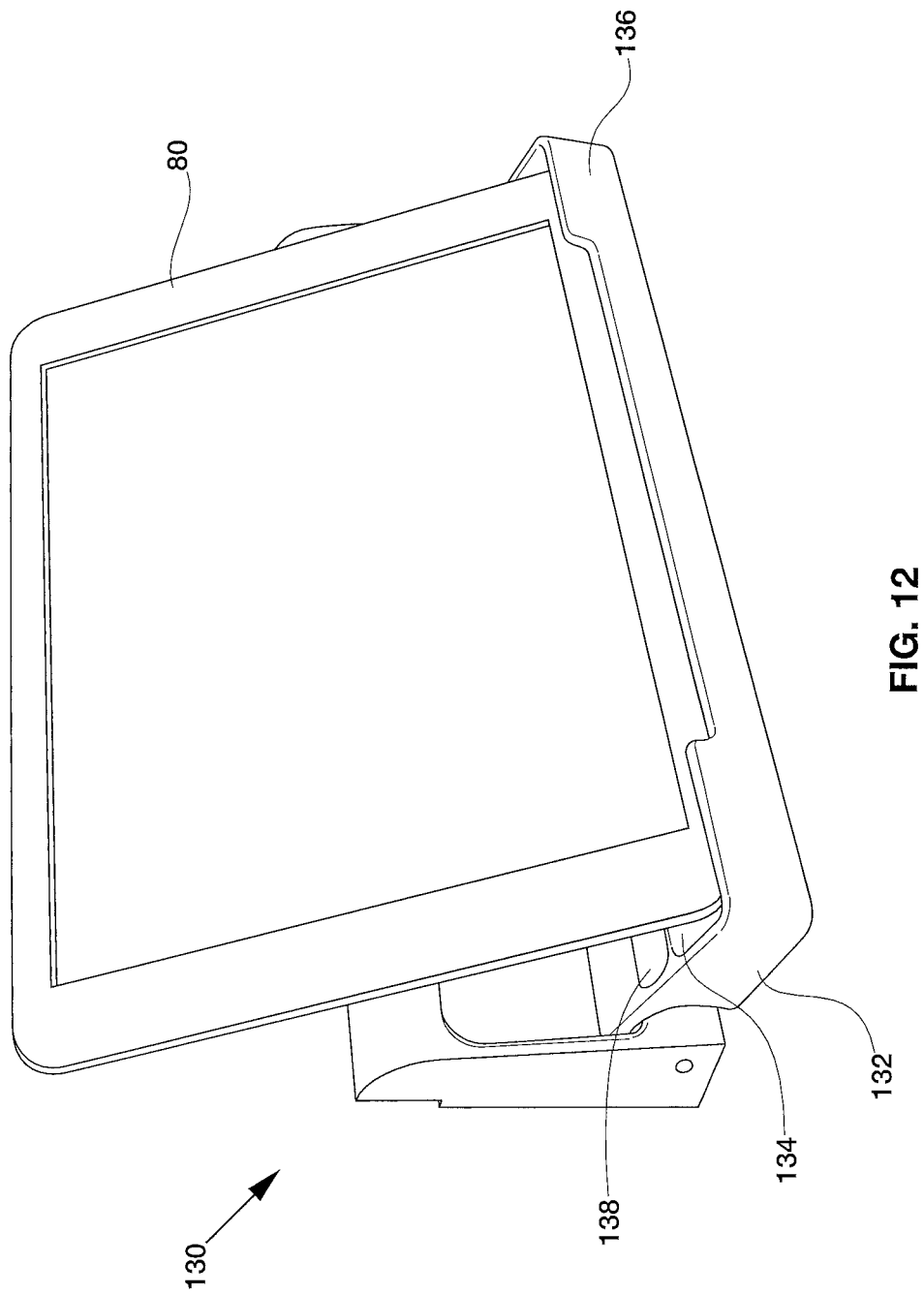
FIG. 12 is a left perspective view of the embodiment shown in FIG. 11 with a PED mounted.

FIG. 11 shows an alternative embodiment of a PED holder 130 for a passenger seat, wherein the pair of opposed retainers are fixed in a mountable position adapted to receive a personal electronic device. The upper front retainer 136 is formed from the front sidewall of door 132. Door 132 includes hinges 140 to transition between either an open configuration or a closed configuration. While in the closed configuration, the pair of opposed retainers remain inaccessible and personal electronic devices cannot be mounted. As best seen in FIG. 12, personal electronic device 80 may be inserted between lower back retainer 134 and upper front retainer 136 of PhD holder 130 while door 132 is in an open configuration. Personal electronic device 80 may be a touchscreen device such as a phone or tablet.

Figure 13:
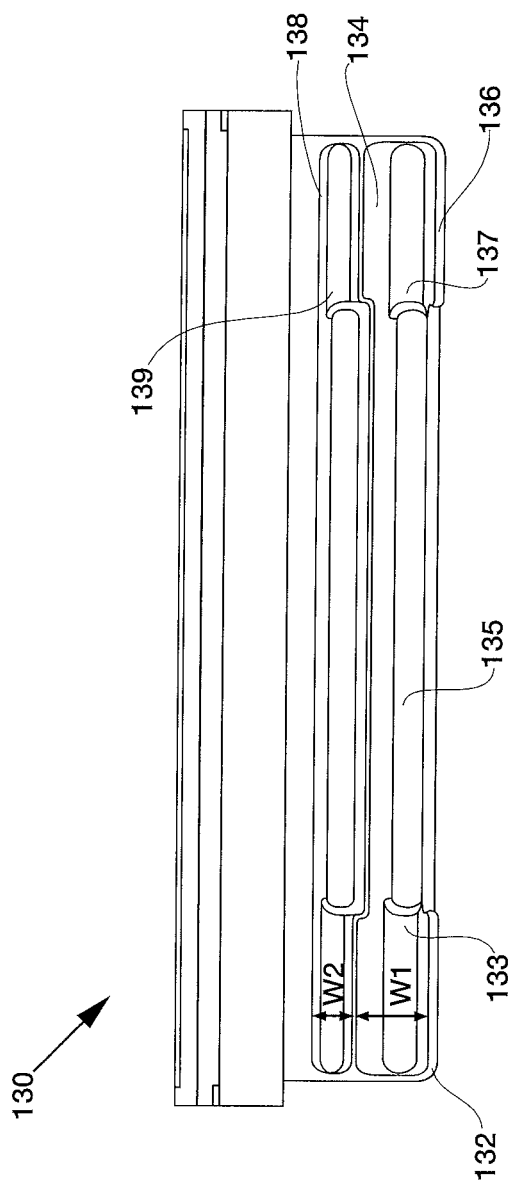
FIG. 13 is a top view of the PED holder in FIG. 11.

As seen in FIG. 13, PED holder 130 includes two receiving areas for inserting personal electronic devices. The first receiving area 137 is formed between lower back retainer 134 and upper front retainer 136. The second receiving area 139 is formed between the upper front retainer 136 and the interior face of the back wall 138 of door 132. The widths of the first receiving area 137 and the second receiving area 139 may be equivalent or may vary. In the embodiment shown in FIG. 13, the width W1 of the first receiving area 137 is greater than the width W2 of the second receiving area 139. Each receiving area includes a floor 133 where the bottom of the personal electronic device 80 rests. Each floor 133 may further include a recess 135 adapted for smaller personal electronic devices.

Figure 14:
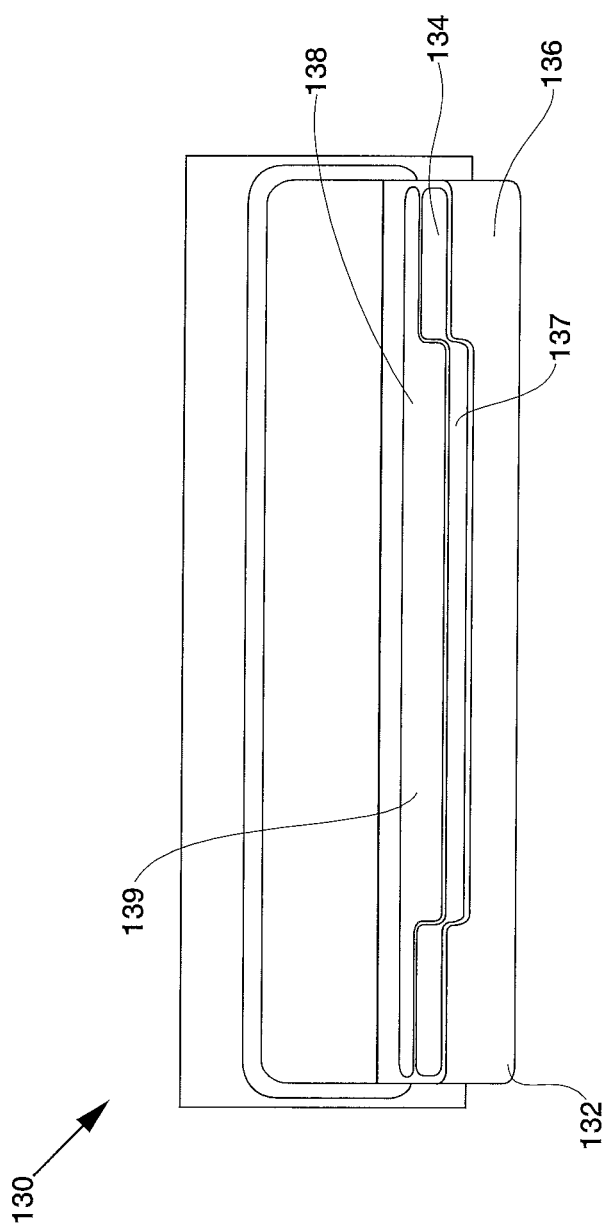
FIG. 14 is a front elevational view of the PED holder in FIG. 11.
Figure 15:
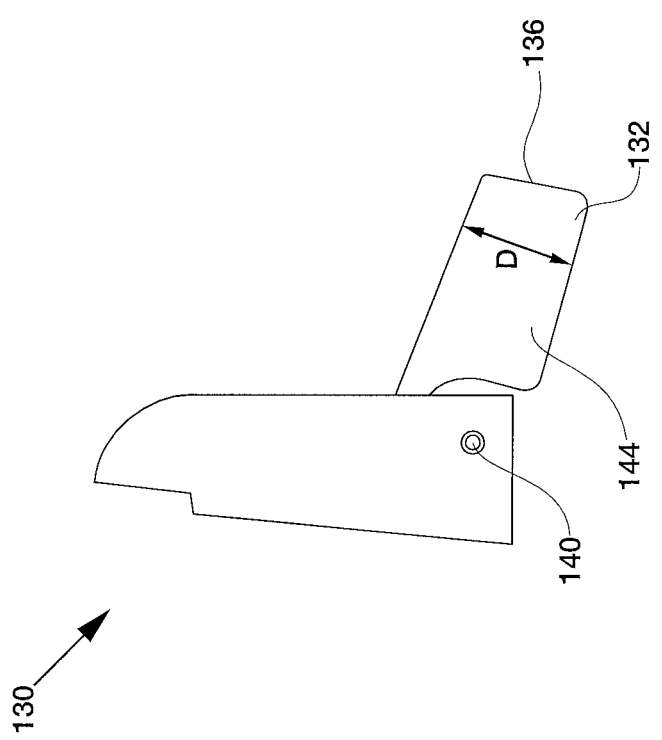
FIG. 15 is a side elevational view of the PED holder in FIG. 11.

Turning to FIG. 14, the lower back retainer 134 has a height that extends over the height of the upper front retainer 136. The upper edge of lower back retainer 134 may extend past the upper edge of upper front retainer 136, so that lower back retainer 134 provides additional support to the back of personal electronic device 80 when in use. FIG. 15 depicts a side view of PED holder 130. The depth D of sidewalls 144 increases from the front to the back of PED holder 130. In the embodiment shown in FIGS. 14 and 15, the upper edges of each retainers are level with the height of sidewall 144. In some embodiments, the depth of second receiving area 139 is deeper than the depth of first receiving area 137. In the embodiment shown, the depths of the first and second receiving areas are substantially equivalent.

Figure 16:
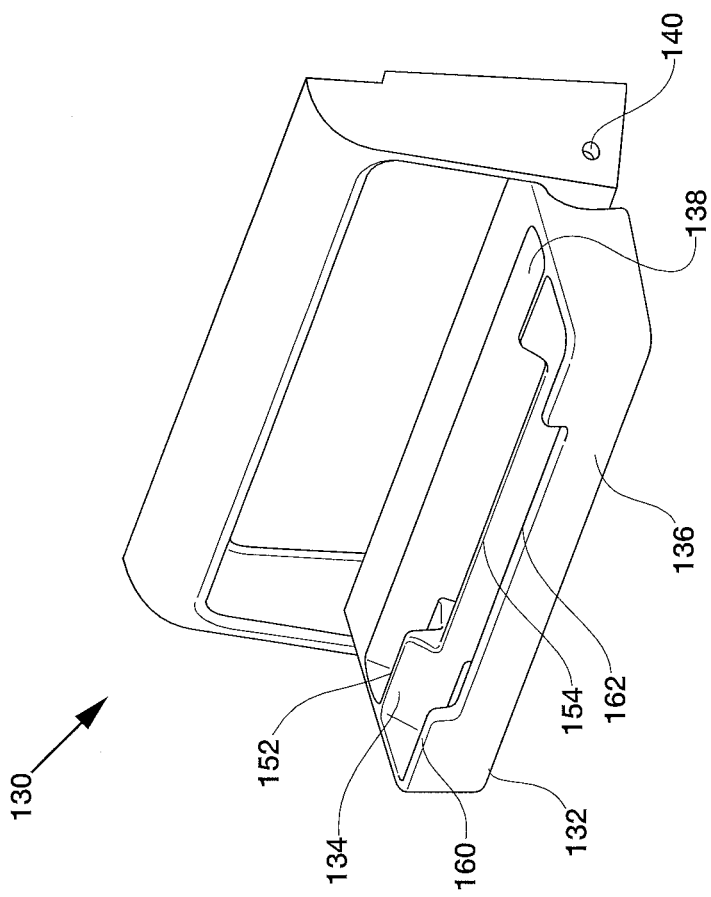
FIG. 16 is a right perspective view of the PED holder in FIG. 11.

Lower back retainer 134 may be slanted at an angle, as best seen in FIGS. 11 and 16. Slanting lower back retainer 134 at an angle may be useful for optimizing the viewing angle of personal electronic device 80 as well as accommodate variations in thicknesses due to the device itself or the installation of other accessories. The upper front retainer 136 is positioned in front of lower back retainer 134 and may be adapted to support a portion of the front face of personal electronic device 80. In one embodiment, the upper front retainer 136 may have a single-portioned upper edge. For example, the upper edge may be flat or curved.

In the embodiment shown in FIG. 16, the upper edge of upper front retainer 136 includes a first portion 160 and a second portion 162, with the upper edge of first portion 160 extending past the upper edge of second portion 162. First portion 160 may be useful for providing additional support to personal electronic device 80, while at the same time, not obstructing the view of personal electronic device 80. When a personal electronic device 80 is mounted, first portion 160 may be positioned along the bezel of personal electronic device 80. A lowered second portion 162 can provide additional support to the device, while at a lowered height that minimizes view obstruction. Having a lowered height for second portion 162 may also enable accessibility of physical buttons located on the face of personal electronic device 80.

The upper edge of lower back retainer 134 also includes a first portion 152 and a second portion 154. First portion 152 extends past second portion 154. The second portion 154 may also be useful for positioning accessory ports to be accessible. Accessory ports may include headphone jacks, USB ports, or a power cord input. In some embodiments, gap 56 is sized such that a phone may be mounted onto PED holder 30. Further embodiments may include a lower back retainer 34 having a single-portioned upper edge.

In operation, the PED holder remains in a stowed position until a passenger wishes to mount a personal electronic device. The passenger opens the door of the PED holder and places the pair of opposed retainers in a mountable position. The personal electronic device is then inserted between the retainers, and at least one of the retainers may be adjusted to accommodate the thickness of the personal electronic device. Once the personal electronic device is mounted, the viewing angle may be further adjusted by rotating the retainers to a desired position. After use, the PED holder may be stowed away by placing the retainers in a stowed position and closing the door.

Certain modifications and improvements will occur to those skilled in the art upon a reading of the foregoing description. By way of example, the PED holder disclosed herein may be installed in other types of vehicles, such as an automobile. Also, the PED holder is not limited to installation on the back of a passenger seat. For instance, the PED holder may be installed onto a dashboard of an automobile. It should be understood that all such modifications and improvements have been deleted herein for the sake of conciseness and readability but are properly within the scope of the following claims.

We claim:

1. A seat system for a passenger aircraft, said seat system comprising:
   (a) at least one passenger seat; and
   (b) a stowable clamshell holder for a personal electronic device installed into the back of said passenger seat, said PED holder including (i) a door adapted to be movable between an open position and a closed position, wherein said door includes a faceplate and a hinge for opening and closing said door and further including at least one hinge positioner on said hinge adapted to bias said faceplate in the closed position.

2. The seat system according to claim 1 further including a seat back tray table attached to the back of said passenger seat.

3. The seat system according to claim 2, wherein said seat back tray table attached to the back of said passenger seat is movable between a first storage position and a second deployed position.

4. The seat system according to claim 3 further including a lock mechanism attached to the back of said passenger seat for retaining said seat back tray table in its secured position.

5. The seat system according to claim 1, wherein said passenger seat further includes a display attached to the back of said passenger seat.

6. The seat system according to claim 5, wherein said display is adjoined by a seat back bezel.

7. The seat system according to claim 1, wherein said passenger seat includes a base frame, a seat component attached to said base frame and a backrest attached to said base frame adjoining the seat component.

8. The seat system according to claim 7, wherein said backrest further includes a headrest.

9. The seat system according to claim 8, wherein said headrest is adjustable to accommodate for the height of the passenger.

10. The seat system according to claim 7, wherein said passenger seat further includes an upholstery package.

11. The seat system according to claim 10, wherein said passenger seat further includes a trim package.

12. A stowable clamshell holder for a personal electronic device adapted to be installed into the back of a seat system for a passenger aircraft wherein the seat system includes at least one passenger seat, said PED holder comprising:
    (a) a door adapted to be movable between an open position and a closed position, wherein said door includes a faceplate and a hinge for opening and closing said door and further including at least one hinge positioner on said hinge adapted to bias said faceplate in the closed position; and
    (b) a pair of opposed retainers adapted to hold a personal electronic device, said pair of retainers including a lower back retainer having a first height and an upper front retainer having a second height wherein the first height of said lower back retainer extends above the second height of said upper front retainer.

13. The PED holder according to claim 12 further including sidewalls along said door, said sidewalls having an interior face and an exterior face.

14. The PED holder according to claim 12 further including a gap between the back of said passenger seat and the upper edge of said faceplate, said gap adapted to allow a user to open said door.

15. The PED holder according to claim 12, wherein said hinge positioner includes at least one torque insert comprising a first cylinder inserted into a cavity of a second cylinder.

16. The PED holder according to claim 15, wherein said hinge positioner is a pair of torque inserts located at opposing ends of said door, each of said hinge positioners attached to the interior face of the back of said passenger seat.

17. The PED holder according to claim 12 further including a stop adapted to restrict movement of said faceplate.

18. The PED holder according to claim 12, wherein the upper edge of said lower back retainer extends past the upper edge of said upper front retainer whereby said lower back retainer is adapted to provide additional support to the back of a PED when in use.

19. The PED holder according to claim 12, wherein the upper edge of said lower back retainer further includes a first portion and a second portion wherein the upper edge of said first portion extends past the upper edge of said second portion, whereby said second portion forms a gap centrally located in said lower back retainer adapted to provide a user gripping area.

20. The PED holder according to claim 12, wherein the upper edge of said upper front retainer comprises a first portion and a second portion wherein the upper edge of said first portion extends past the upper edge of said second portion, whereby said second portion is adapted to provide additional support to the front of a PED when in use.

21. The PED holder according to claim 12 further including a shroud on the back of said passenger seat.

22. The PED holder according to claim 12 further including a bezel attached to the back of said passenger seat.

23. A seat system for a passenger aircraft, said seat system comprising:
    (a) at least one passenger seat;
    (b) a stowable clamshell holder for a personal electronic device installed into the back of said passenger seat, said PED holder including (i) a door adapted to be movable between an open position and a closed position, wherein said door includes a faceplate and a hinge for opening and closing said door and further including at least one hinge positioner on said hinge adapted to bias said faceplate in the closed position and (ii) a pair of opposed retainers adapted to hold a personal electronic device, said pair of retainers including a lower back retainer having a first height and an upper front retainer having a second height wherein the first height of said lower back retainer extends above the second height of said upper front retainer; and (c) a seat back tray table attached to the back of said passenger seat.

24. The seat system according to claim 23, wherein said seat back tray table attached to the back of said passenger seat is movable between a first storage position and a second deployed position.

25. The seat system according to claim 24 further including a lock mechanism attached to the back of said passenger seat for retaining said seat back tray table in its secured position.

26. The seat system according to claim 23, wherein said passenger seat further includes a display attached to the back of said passenger seat.

27. The seat system according to claim 26, wherein said display is adjoined by a seat back bezel.

28. The seat system according to claim 23, wherein said passenger seat includes a base frame, a seat component attached to said base frame and a backrest attached to said base frame adjoining the seat component.

29. The seat system according to claim 28, wherein said backrest further includes a headrest.

30. The seat system according to claim 29, wherein said headrest is adjustable to accommodate for the height of the passenger.

31. The seat system according to claim 28, wherein said passenger seat further includes an upholstery package.

32. The seat system according to claim 31, wherein said passenger seat further includes a trim package.

33. The seat system according to claim 23 further including sidewalls along said door, said sidewalls having an interior face and an exterior face.

34. The seat system according to claim 23 further including a gap between the back of said passenger seat and the upper edge of said faceplate, said gap adapted to allow a user to open said door.

35. The seat system according to claim 23, wherein said hinge positioner includes at least one torque insert comprising a first cylinder inserted into a cavity of a second cylinder.

36. The seat system according to claim 35, wherein said hinge positioner is a pair of torque inserts located at opposing ends of said door, each of said hinge positioners attached to the interior face of the back of said passenger seat.

37. The seat system according to claim 23 further including a stop adapted to restrict movement of said faceplate.

38. The seat system according to claim 23, wherein the upper edge of said lower back retainer extends past the upper edge of said upper front retainer whereby said lower back retainer is adapted to provide additional support to the back of a PED when in use.

39. The seat system according to claim 23 wherein the upper edge of said lower back retainer further includes a first portion and a second portion wherein the upper edge of said first portion extends past the upper edge of said second portion, whereby said second portion forms a gap centrally located in said lower back retainer adapted to provide a user gripping area.

40. The seat system according to claim 23, wherein the upper edge of said upper front retainer comprises a first portion and a second portion wherein the upper edge of said first portion extends past the upper edge of said second portion, whereby said second portion is adapted to provide additional support to the front of a PED when in use.

41. The seat system according to claim 23 further including a shroud on the back of said passenger seat.

42. The seat system according to claim 23 further including a bezel attached to the back of said passenger seat.

* * * * *